US012332577B2

(12) United States Patent
Asano

(10) Patent No.: US 12,332,577 B2
(45) Date of Patent: Jun. 17, 2025

(54) VOLTAGE GENERATING APPARATUS AND IMAGE FORMING APPARATUS

(71) Applicant: CANON KABUSHIKI KAISHA, Tokyo (JP)

(72) Inventor: Hiroki Asano, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/205,617

(22) Filed: Jun. 5, 2023

(65) Prior Publication Data

US 2023/0408949 A1 Dec. 21, 2023

(30) Foreign Application Priority Data

Jun. 16, 2022 (JP) ................................ 2022-097423

(51) Int. Cl.
*G03G 15/02* (2006.01)
*G03G 15/00* (2006.01)
*G03G 15/06* (2006.01)
*G03G 15/08* (2006.01)

(52) U.S. Cl.
CPC ....... *G03G 15/0266* (2013.01); *G03G 15/065* (2013.01); *G03G 15/0812* (2013.01); *G03G 15/5004* (2013.01); *G03G 15/80* (2013.01); *G03G 2215/025* (2013.01)

(58) Field of Classification Search
CPC ............ G03G 15/065; G03G 15/0812; G03G 15/5004; G03G 15/80; G03G 2215/0805
See application file for complete search history.

(56) References Cited

U.S. PATENT DOCUMENTS

| | | | | |
|---|---|---|---|---|
| 2017/0005585 | A1 | 1/2017 | Shimura et al. | |
| 2017/0176918 | A1 | 6/2017 | Shimura et al. | |
| 2018/0316269 | A1 | 11/2018 | Shimura et al. | |
| 2019/0020268 | A1 | 1/2019 | Saito et al. | |
| 2019/0058387 | A1 | 2/2019 | Shimura et al. | |
| 2019/0058406 | A1 | 2/2019 | Asano et al. | |
| 2019/0098159 | A1 | 3/2019 | Asano et al. | |
| 2019/0149054 | A1 | 5/2019 | Shimura et al. | |
| 2019/0260295 | A1 | 8/2019 | Shimura et al. | |
| 2020/0186044 | A1 | 6/2020 | Asano | |
| 2020/0201202 | A1 * | 6/2020 | Miura | G03G 15/0225 |
| 2021/0084185 | A1 * | 3/2021 | Watanabe | G03G 15/80 |

FOREIGN PATENT DOCUMENTS

| | | | |
|---|---|---|---|
| JP | 2002-153062 | A | 5/2002 |
| JP | 2017-219666 | A | 12/2017 |
| JP | 2021-141671 | A | 9/2021 |
| JP | 2021-173882 | A | 11/2021 |

* cited by examiner

*Primary Examiner* — Carla J Therrien
(74) *Attorney, Agent, or Firm* — Venable LLP

(57) ABSTRACT

A voltage generating apparatus includes: a first circuit configured to output a first voltage; a controller configured to control a value of the first voltage output by the first circuit with a control signal; and a storage unit configured to store control information of the first circuit. The controller uses the control signal for communication with the storage unit.

5 Claims, 4 Drawing Sheets

FIG. 4

| | | |
|---|---|---|
| DEVELOPING ROLLER STATE | STOP | ROTATION |
| ELECTRIC POTENTIAL DIFFERENCE BETWEEN Vdev AND Vbld | 0 | ΔVz |
| BLD_SW | PULSE SIGNAL | HIGH OR LOW LEVEL |
| COMMUNICATE WITH NON-VOLATILE MEMORY | POSSIBLE | IMPOSSIBLE |

FIG. 5

| | | |
|---|---|---|
| DEVELOPING ROLLER STATE | STOP | ROTATION |
| ELECTRIC POTENTIAL DIFFERENCE BETWEEN Vdev AND Vbld | 0 | ΔVz |
| PULSE SIGNAL FREQUENCY OUTPUTTED FROM BLD_SW | LARGER THAN SECOND THRESHOLD | LOWER THAN OR EQUAL TO FIRST THRESHOLD |
| COMMUNICATE WITH NON-VOLATILE MEMORY | POSSIBLE | POSSIBLE |

VOLTAGE GENERATING APPARATUS AND IMAGE FORMING APPARATUS

BACKGROUND OF THE INVENTION

Field of the Invention

The present invention relates to a voltage generating apparatus and an image forming apparatus.

Description of the Related Art

Usually, various types of apparatus include a voltage generating apparatus configured to generate various values of voltage used for operating the various types of apparatus. For example, an electrophotographic type image forming apparatus includes a voltage generating apparatus configured to generate charging voltage used for charging a photoconductor, developing voltage used for developing an electrostatic latent image formed at the photoconductor, and the like. In order to stably operate the apparatus, the voltage generating apparatus is required to accurately control the value of each voltage generated by the voltage generating apparatus.

Japanese Patent Laid-Open No. 2021-141671 discloses a configuration that stores control information in a nonvolatile memory of the voltage generating apparatus. The voltage generating apparatus controls a circuit, which is configured to generate voltage, based on control information stored in the nonvolatile memory, to bring the value of the voltage being generated closer to a target value.

In the configuration of Japanese Patent Laid-Open No. 2021-141671, a control unit of the voltage generating apparatus and a substrate (referred to as a power supply substrate in the following) provided with circuits each configured to generate voltage and a nonvolatile memory are connected via a plurality of signal lines. The plurality of signal lines includes a signal line configured to control the voltage generated by each of the circuits, and a signal line configured to read control information stored in the nonvolatile memory. Here, by reducing the number of signal lines connected to the control unit, the total cost can be reduced.

SUMMARY OF THE INVENTION

According to an aspect of the present invention, a voltage generating apparatus includes: a first circuit configured to output a first voltage; a controller configured to control a value of the first voltage output by the first circuit with a control signal; and a storage unit configured to store control information of the first circuit, wherein the controller uses the control signal for communication with the storage unit.

Further features of the present invention will become apparent from the following description of exemplary embodiments with reference to the attached drawings.

BRIEF DESCRIPTION OF THE DRAWINGS

FIG. 4 is an explanatory diagram of a control method of a blade circuit, according to an embodiment; and FIG. 5 is an explanatory diagram of a control method of a blade circuit, according to an embodiment.

DESCRIPTION OF THE EMBODIMENTS

Figure 1:
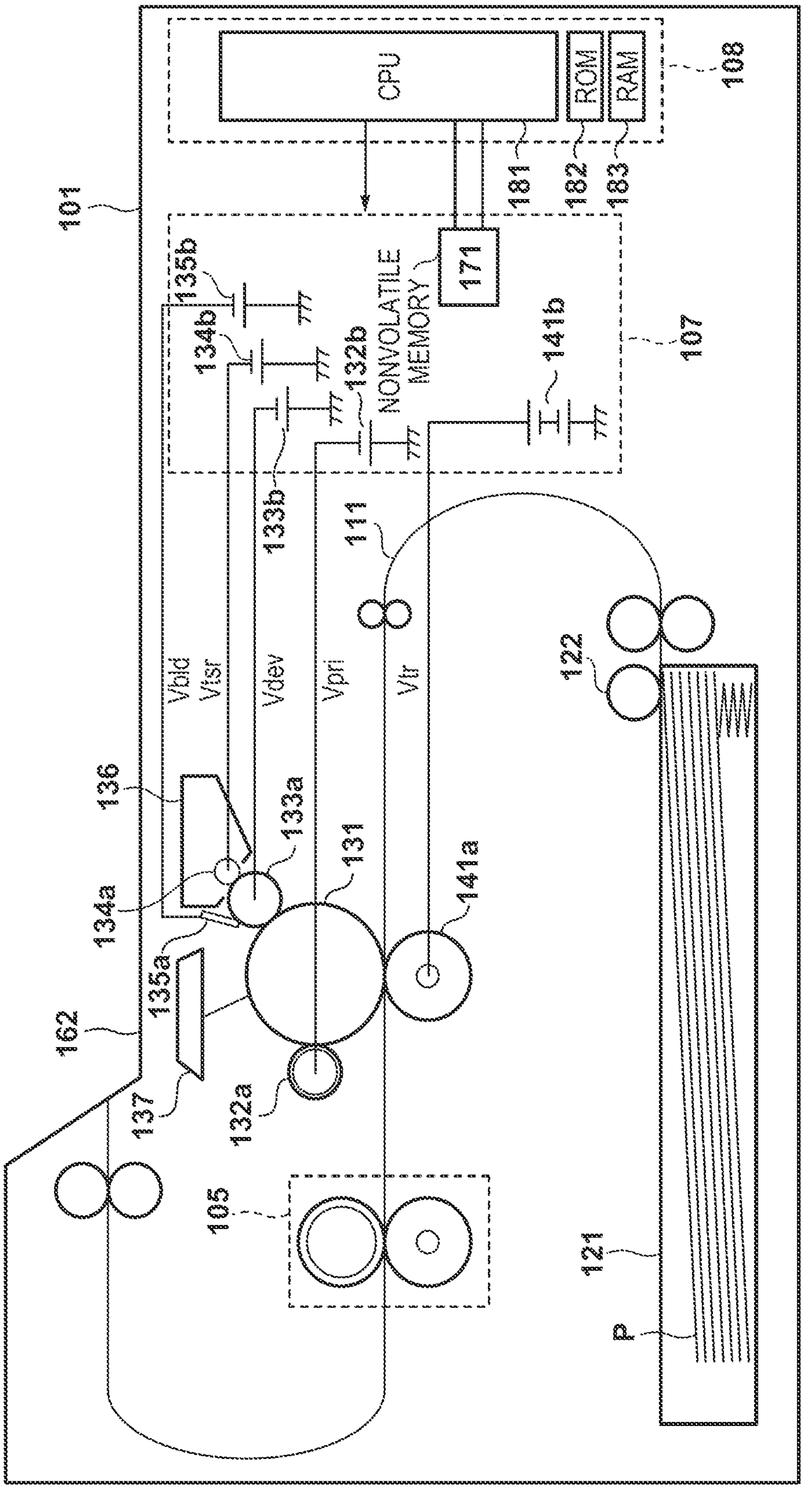
FIG. 1 is a schematic cross-sectional view of an image forming apparatus, according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate.

Furthermore, in the attached drawings, the same reference numerals are given to the same or similar configurations, and redundant description thereof is omitted.

First Embodiment

FIG. 1 is a schematic cross-sectional view of an image forming apparatus 101 according to the present embodiment. Circuits each configured to generate various types of voltage and a nonvolatile memory 171 are mounted in the power supply substrate 107. Specifically, a charging circuit 132*b* provided in the power supply substrate 107 generates a charging voltage Vpri and outputs the same to a charging roller 132*a*. A developing circuit 133*b* generates a developing voltage Vdev and outputs the same to a developing roller 133*a*. A toner supply circuit 134*b* generates a toner supply voltage Vtsr and outputs the same to a toner supply roller 134*a*. A blade circuit 135*b* generates a blade voltage Vbld and outputs the same to a developing blade 135*a*. A transfer circuit 141*b* generates a transfer voltage Vtr and outputs the same to a transfer roller 141*a*. The charging circuit 132*b*, the developing circuit 133*b*, the toner supply circuit 134*b*, the blade circuit 135*b*, and the transfer circuit 141*b* are circuits that generate various types of voltage used by the image forming apparatus 101 for image forming, and will be collectively referred to as "circuits" below for simplicity. The nonvolatile memory 171 stores control information (correction information) for correcting the value of the voltage generated by each circuit.

The photoconductor 131 is rotationally driven in a clockwise direction in the drawing in forming an image. The charging roller 132*a* charges the surface of the photoconductor 131 with the charging voltage Vpri. A scanning unit 137 forms an electrostatic latent image at the photoconductor 131 by scanning and exposing the photoconductor 131 based on image data. The toner supply roller 134*a* applies the toner supply voltage Vtsr to transmit the toner stored in a toner container 136 to the surface of the developing roller 133*a*. The developing roller 133*a* develops the electrostatic latent image at the photoconductor 131 with toner by the developing voltage Vdev, whereby a toner image is formed at the photoconductor 131. Here, the developing blade 135*a* is provided to regulate the thickness and make the height of the layer of toner uniform on the developing roller 133*a*.

In order to transmit the toner stored in the toner container 136 to the surface of the developing roller 133*a*, the absolute value of the toner supply voltage Vtsr is set to be larger than the absolute value of the developing voltage Vdev. In addition, in order to prevent toner from sticking to the developing blade 135*a*, the absolute value of the blade voltage Vbld is set to be larger than the absolute value of the developing voltage Vdev. For example, the developing voltage Vdev is set to −300 V, and the toner supply voltage Vtsr and blade voltage Vbld are set to −400 V.

A printing material P stored in a cassette 121 is fed to a conveyance path 111 by a feeding roller 122, and conveyed to a position facing the photoconductor 131. The transfer roller 141*a* transfers the toner image on the photoconductor 131 to the printing material P by the transfer voltage Vtr. The fixing unit 105 fixes the toner image to the printing material P by heating and pressurizing the printing material P. After the fixing of the printing material P, the printing material P is discharged to a discharge tray 162.

The CPU 181 of the control unit 108 controls the image forming apparatus 101 by executing various programs stored in a ROM 182. When controlling the image forming apparatus 101, the CPU 181 uses a RAM 183 to store temporary information, or the like. The control performed by the CPU 181 includes control of the voltage output from each circuit of the power supply substrate 107. At this time, the CPU 181 uses the control information stored in the nonvolatile memory 171.

Figure 2:
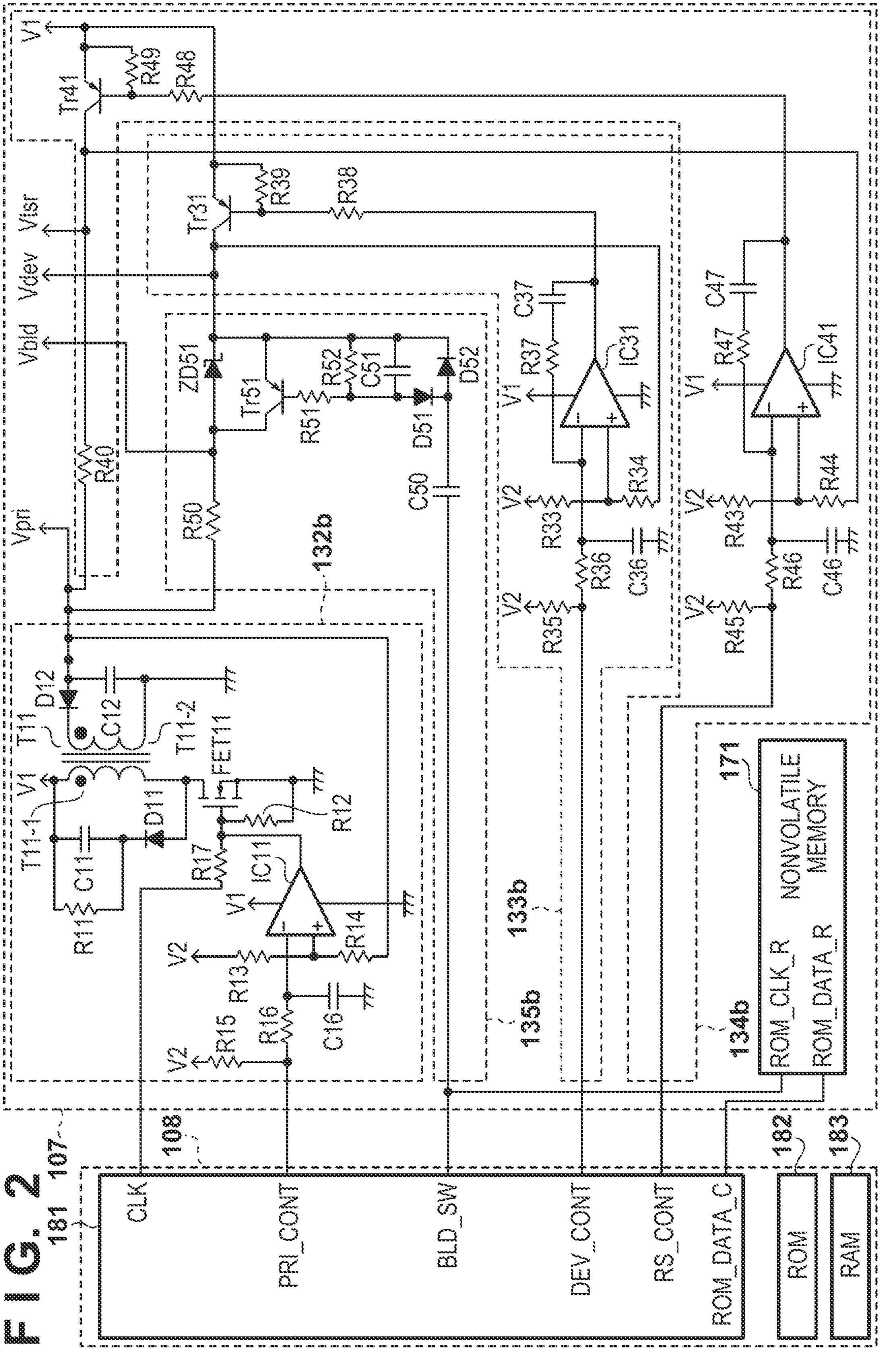
FIG. 2 is a configuration diagram of a voltage generating apparatus, according to an embodiment.

FIG. 2 illustrates a configuration of the voltage generating apparatus. The voltage generating apparatus corresponds to the circuits and the nonvolatile memory 171 mounted on the power supply substrate 107, for example.

Alternatively, the voltage generating apparatus corresponds to the circuits and the nonvolatile memory 171 mounted on the power supply substrate 107, and to a functional part of the control unit 108 that controls each circuit of the power supply substrate 107 and communicates with the nonvolatile memory 171. It is assumed in the following description that the power supply substrate 107 illustrated in FIG. 2 and the functional part of the control unit 108 that controls the power supply substrate 107 are included in the voltage generating apparatus.

First, the charging circuit 132*b* will be described. A power supply voltage V1 is connected to one of the terminals of a primary winding T11-1 of a transformer T11, and an FET11 is connected to the other terminal. For example, the power supply voltage V1 is 24 V. The source terminal of the FET11 is connected to ground (GND). In addition, the source terminal and the gate terminal of the FET11 are connected via a resistor R12. The gate terminal of the FET11 is connected to a CLK terminal of the CPU 181 via a resistor R17. The CPU 181 outputs, from the CLK terminal, a square wave, i.e., a pulse signal, alternating between a high level and a low level. When the pulse signal from the CLK terminal changes to the high level, the FET11 turns to be an ON state and the drain voltage of the FET11 drops to approximately GND potential. And thus, voltage is applied to both terminals of the primary winding T11-1 of the transformer T11, and excitation current flows in the primary winding T11-1. Subsequently, when a pulse signal from the CLK terminal changes to the low level, the FET11 turns to be an OFF state and a flyback voltage is generated between both terminals of the primary winding T11-1. Simultaneously, in a secondary winding T11-2, the flyback voltage corresponding to the turn ratio between the primary winding T11-1 and the secondary winding T11-2 is also generated. The flyback voltage generated in the secondary winding T11-2 is rectified and smoothed by a rectifier circuit including a diode D12 and a capacitor C12, thereby the charging voltage Vpri is generated. For example, the value of the charging voltage Vpri is −1500 V. In addition, the capacitor C11, the resistor R11, and the diode D11 connected between the both terminals of the primary winding T11-1 serve as a snubber that absorbs the surge voltage due to the leakage inductance of the primary winding T11-1.

The charging circuit 132*b* has a feedback control configuration for stably controlling the charging voltage Vpri to a desired voltage. Specifically, the charging voltage Vpri is connected to the power supply voltage V2 via a resistor R14 and a resistor R13, as illustrated in FIG. 2. For example, the power supply voltage V2 is 5 V. The connection point of the resistor R14 and the resistor R13 is connected to the positive input terminal of a comparator IC11. The negative input terminal of the comparator IC11 is connected to the power supply voltage V2 via a resistor R16 and a resistor R15, and further connected to GND via a capacitor C16. The connection point of the resistor R15 and the resistor R16 is connected to a PRI_CONT terminal of the CPU 181. In addition, the output terminal of the comparator IC11 is connected to the gate terminal of the FET11. The CPU 181 outputs, from the PRI_CONT terminal, a pulse signal alternately repeating between a high-impedance (denoted Hi-Z in the following) state and a low state. While the PRI_CONT terminal is at the Hi-Z state, electric current that charges the capacitor C16 flows from the power supply voltage V2 via the resistor R15 and the resistor R16. On the other hand, while the PRI_CONT terminal is at the low state, electric current that discharges the capacitor C16 flows toward the PRI_CONT terminal via the resistor R16. When the PRI_CONT terminal alternately repeats between the Hi-Z state and the low state, the balance of charging/discharging of the capacitor C16 is stabilized at a predetermined voltage, whereby the voltage at the negative input terminal of the comparator IC11 also stabilizes at the predetermined voltage. The predetermined voltage is determined by the duty ratio of the pulse signal from the PRI_CONT terminal. Specifically, as the proportion of the low state of the pulse signal from the PRI_CONT terminal becomes larger, the voltage at the negative input terminal of the comparator IC11 becomes lower.

Figure 3A:
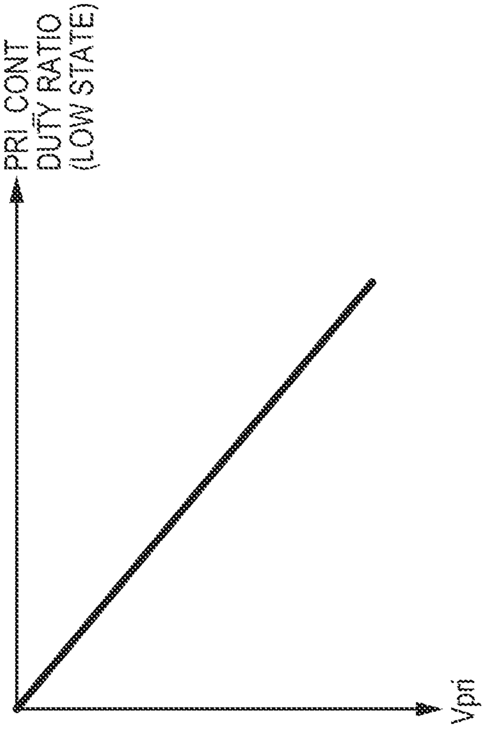
FIGS. 3A to 3D are explanatory diagrams of the operation of each circuit, according to an embodiment.

Here, when the voltage at the negative input terminal of the comparator IC11 is lower than the voltage at the positive input terminal of the comparator IC11, the output terminal of the comparator IC11 is in the Hi-Z state. In such a case, the pulse signal output from the CLK terminal of the CPU 181 directly drives ON/OFF of the FET11. When, on the other hand, the voltage at the negative input terminal of the comparator IC11 is higher than or equal to the voltage of the positive input terminal of the comparator IC11, the output terminal of the comparator IC11 is in the low state. In such a case, the FET11 is in the OFF state regardless of the level of the pulse signal from the CLK terminal, thereby the absolute value of the charging voltage Vpri is low. Therefore, as the duty ratio at the low state of the pulse signal output from the PRI_CONT terminal becomes larger, the absolute value of the charging voltage Vpri becomes larger, as illustrated in FIG. 3A.

Subsequently, the developing circuit 133*b* will be described below. The developing circuit 133*b* generates the developing voltage Vdev by dividing the charging voltage Vpri. The collector terminal of a transistor Tr31 of the developing circuit 133*b* is connected to the charging voltage Vpri via a resistor R50 and a Zener diode ZD51. The emitter terminal of the transistor Tr31 is connected to the power supply voltage V1. The base terminal and the emitter terminal of the transistor Tr31 are connected via a resistor R39. In addition, the base terminal of the transistor Tr31 is connected to the output terminal of an operation amplifier IC31 via a resistor R38. Noted that, the voltage at the collector terminal of the transistor Tr31 is the developing voltage Vdev.

The developing circuit 133*b* also has a feedback control configuration for stably controlling the developing voltage Vdev to a desired voltage. Specifically, the developing voltage Vdev is connected to the power supply voltage V2 via a resistor R34 and a resistor R33. The connection point of the resistor R34 and the resistor R33 is connected to the positive input terminal of the operation amplifier IC31. The negative input terminal of the operation amplifier IC31 is connected to the power supply voltage V2 via a resistor R36 and a resistor R35, and further connected to GND via a capacitor C36. The connection point of the resistor R35 and the resistor R36 is connected to a DEV_CONT terminal of the CPU 181. The negative input terminal and the output terminal of the operation amplifier IC31 are connected via a resistor R37 and a capacitor C37. The connection is made for phase compensation of the operation amplifier IC31, which contributes to stabilization of feedback control.

The DEV_CONT terminal of the CPU 181 outputs a pulse signal alternately repeating between the Hi-Z state and the low state. While the DEV_CONT terminal is at the Hi-Z state, electric current that charges the capacitor C36 flows from the power supply voltage V2 via the resistor R35 and the resistor R36. On the other hand, electric current that discharges the capacitor C36 flows toward the DEV_CONT terminal via the resistor R36 while the DEV_CONT terminal is in the low state. When the DEV_CONT terminal alternately repeats between the Hi-Z state and the low state, the balance of charging/discharging of the capacitor C36 is stabilized at a predetermined voltage, whereby the voltage at the negative input terminal of the operation amplifier IC31 also stabilizes at the predetermined voltage. The predetermined voltage is determined by the duty ratio of the pulse signal from the DEV_CONT terminal. Specifically, as the proportion of the low state of the pulse signal from the DEV_CONT terminal becomes larger, the voltage at the negative input terminal of the comparator IC11 becomes lower.

Figure 3B:
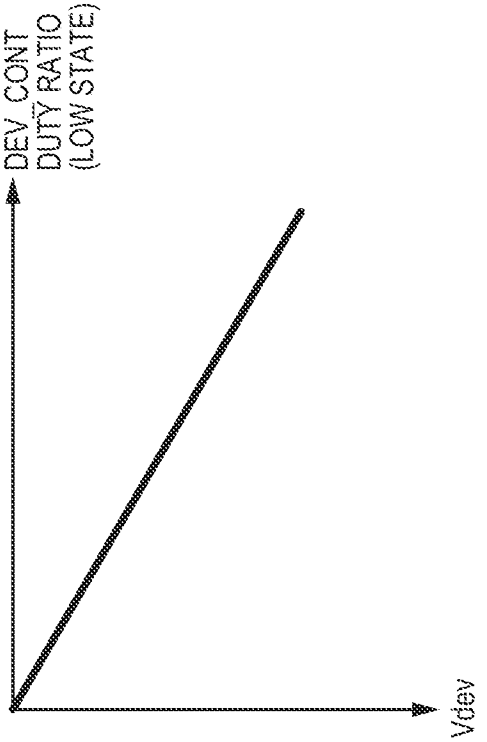

When the voltage at the negative input terminal of the operation amplifier IC31 is lower than the voltage at the positive input terminal of the operation amplifier IC31, the output terminal of the operation amplifier IC31 is at the high level and the transistor Tr31 is in an OFF state. And thus, the absolute value of the developing voltage Vdev rises. When, on the other hand, the voltage at the negative input terminal of the operation amplifier IC31 is higher than or equal to the voltage at the positive input terminal of the operation amplifier IC31, the output terminal of the operation amplifier IC31 is at the low level and the transistor Tr31 is in an ON state. And thus, the absolute value of the developing voltage Vdev decreases. Therefore, as the duty ratio of the low state of the pulse signal output from the DEV_CONT terminal becomes larger, the absolute value of the developing voltage Vdev becomes larger, as illustrated in FIG. 3B. For example, the value of the developing voltage Vdev is −300 V.

Subsequently, the blade circuit 135*b* will be described below. As illustrated in FIG. 2, the developing voltage Vdev is the voltage at the cathode terminal of Zener diode ZD51, and the blade voltage Vbld is the voltage at the anode terminal of Zener diode ZD51. Therefore, when a transistor Tr51 connected in parallel with the Zener diode ZD51 is in an OFF state, the absolute value of the blade voltage Vbld is higher value than the developing voltage Vdev by an amount corresponding to the Zener voltage of Zener diode ZD51. When the transistor Tr51 turns to be an ON state, both terminals of the Zener diode ZD51 are short-circuited, whereby the blade voltage Vbld becomes a voltage equivalent to the developing voltage Vdev. As such, the blade circuit 135*b* is configured to select whether to differentiate the blade voltage Vbld from the developing voltage Vdev by a predetermined electric potential difference, or to equalize the blade voltage Vbld and the developing voltage Vdev at a same electric potential. The reason will be explained below.

When an electric potential difference arises between the developing roller 133*a* and the developing blade 135*a* in a state where rotation of the developing roller 133*a* is stopped, the physical properties of the contact portion may change. If the developing roller 133*a* is rotated to form an image after such a situation, image defects such as streaks may occur. When, on the other hand, the developing roller 133*a* is rotating in order to prevent toner from sticking to the developing blade 135*a*, as has been described above, it is necessary to set the absolute value of the blade voltage Vbld larger than the absolute value of the developing voltage Vdev. Therefore, the voltage generating apparatus of the present embodiment is configured to select whether to differentiate the blade voltage Vbld from the developing voltage Vdev by a predetermined electric potential difference, or to equalize the blade voltage Vbld and the developing voltage Vdev at a same electric potential, as has been described above. Specifically, the control unit 108 makes the transistor Tr51 be in an OFF state while the developing roller 133*a* is rotating, and set the absolute value of the blade voltage Vbld to be larger than the absolute value of the developing voltage Vdev by an amount corresponding to the Zener voltage of the Zener diode ZD51. On the other hand, the control unit 108 makes the transistor Tr51 be in an ON state while the developing roller 133*a* is stopped, and sets the absolute value of the blade voltage Vbld equivalent to the absolute value of the developing voltage Vdev.

The base terminal of the transistor Tr51 is connected to the emitter terminal via a resistor R51 and a resistor R52. A capacitor C51 is connected in parallel to the resistor R52. The connection point of the resistor R51 and the resistor R52 is connected to the anode terminal of a diode D51. The cathode terminal of the diode D51 is connected to the anode terminal of a diode D52, and the cathode terminal of the diode D52 is connected to the emitter terminal of the transistor Tr51. The cathode terminal of diode D51 is connected to the BLD_SW terminal of the CPU 181 via a capacitor C50. The BLD_SW terminal outputs a pulse signal alternately repeating between a high level and a low level. While the pulse signal from the BLD_SW terminal is at the low level, electric current flows in order from the power supply voltage V1, the transistor Tr31, the emitter terminal of the transistor Tr51, the base terminal of the transistor Tr51, the resistor R51, the diode D51, and to the capacitor C50, and finally flows into the BLD_SW terminal. While the BLD_SW terminal is at the high level, the current flowing out from the BLD_SW terminal flows to the power supply voltage V1 via the capacitor C50, the diode D52, and the transistor Tr31. A state where the capacitor C51 is electrically charged, and the base current stably flows out from the base terminal of the transistor Tr51 can be achieved by outputting a pulse signal from the BLD_SW terminal. When the base current from the base terminal of the transistor Tr51 stably flows, the transistor Tr51 is turned ON and both terminals of the Zener diode ZD51 are short-circuited. On the other hand, when the BLD_SW terminal is fixed at the high level or the low level, the transistor Tr51 is in an OFF state, and both terminals of the Zener diode ZD51 are not short-circuited.

Figure 3C:
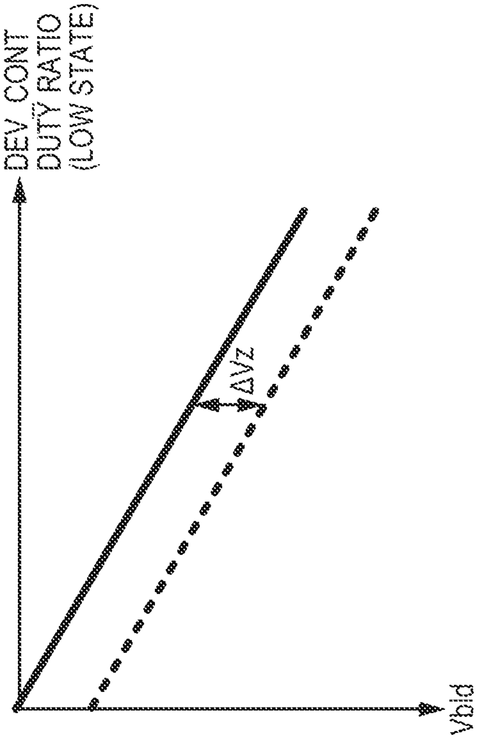

FIG. 3C illustrates a relation between the duty ratio at the low state of the pulse signal output from the DEV_CONT terminal and the blade voltage Vbld. Here, the solid line illustrates the transistor Tr51 in in an ON state, and the dotted line illustrates the transistor Tr51 is in an OFF state. The difference between the solid line and the dotted line is the Zener voltage ΔVz of the Zener diode ZD51. When, for example, the Zener voltage ΔVz is 100 V and the developing voltage Vdev is −300 V, the blade voltage Vbld is −400 V while the transistor Tr51 is in an OFF state.

Subsequently, the toner supply circuit 134*b* will be described below. The toner supply circuit 134*b*, which is a circuit that divides the charging voltage Vpri to generate the toner power supply voltage Vtsr, has an approximately equivalent configuration as that of the developing circuit 133*b*. The difference lies in that there is no Zener diode provided in the voltage dividing line with the charging voltage Vpri. The collector terminal of a transistor Tr41 is connected to the charging voltage Vpri via a resistor R40, and the emitter terminal of the transistor Tr41 is connected to the power supply voltage V1. In addition, the base terminal and the emitter terminal of the transistor Tr41 are connected via a resistor R49. In addition, the base terminal of transistor Tr41 is connected to the output terminal of an operation amplifier IC41 via a resistor R48. Noted that, the voltage at the collector terminal of the transistor Tr41 is the toner supply voltage Vtsr.

The toner supply circuit 134*b* also has a feedback control configuration for stably controlling the toner power supply voltage Vtsr to a desired voltage. Specifically, the toner supply voltage Vtsr is connected to the power supply voltage V2 via a resistor R44 and a resistor R43. The connection point of the resistor R44 and the resistor R43 is connected to the positive input terminal of the operation amplifier IC41. The negative input terminal of the operation amplifier IC41 is connected to the power supply voltage V2 via a resistor R46 and a resistor R45, and further connected to GND via a capacitor C46. The connection point of the resistor R45 and the resistor R46 is connected to the RS_CONT terminal of the CPU 181. A resistor R47 and a capacitor C47 are connected between the negative input terminal and output terminal of the operation amplifier IC41. The connection is made for phase compensation of the operation amplifier IC41, which contributes to stabilization of feedback control.

The RS_CONT terminal outputs a pulse signal alternately repeating between a Hi-Z state and a low state. While the RS_CONT terminal is at the Hi-Z state, electric current that charges the capacitor C46 flows from the power supply voltage V2 via the resistor R45 and the resistor R46. On the other hand, electric current that discharges the capacitor C46 flows toward the RS_CONT terminal via the resistor R46 while the RS_CONT terminal is at the low state. When the RS_CONT terminal alternately repeats between the Hi-Z state and the low state, the balance of charging/discharging of the capacitor C46 is stabilized at a predetermined voltage, whereby the voltage at the negative input terminal of the operation amplifier IC41 also stabilizes at the predetermined voltage. The predetermined voltage is determined by the duty ratio of the pulse signal from the RS_CONT terminal. Specifically, as the proportion of the low state of the pulse signal from the RS_CONT terminal becomes larger, the voltage at the negative input terminal of the operation amplifier IC41 becomes lower.

Figure 3D:
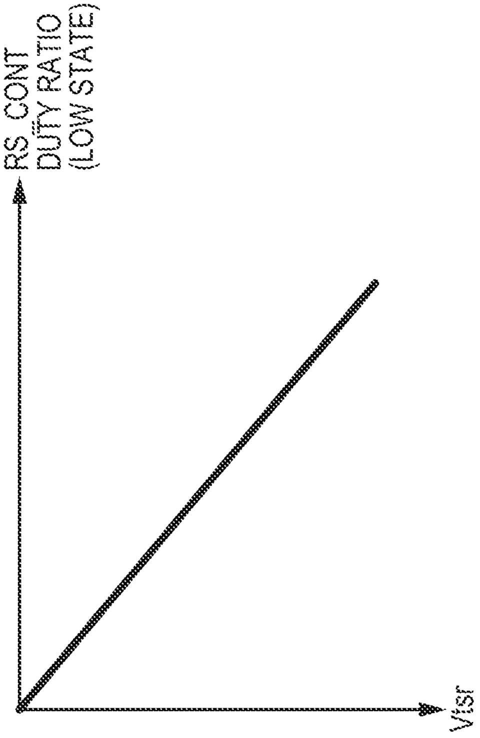

When the voltage at the negative input terminal of the operation amplifier IC41 is lower than the voltage at the positive input terminal of the operation amplifier IC41, the output terminal of the operation amplifier IC41 is at the high level and the transistor Tr41 is in an OFF state. And thus, the absolute value of the toner supply voltage Vtsr rises. When, on the other hand, the voltage at the negative input terminal of the operation amplifier IC41 is higher than or equal to the voltage at the positive input terminal of the operation amplifier IC41, the output terminal of the operation amplifier IC41 is at the low level and the transistor Tr41 is in an ON state. And thus, the absolute value of the toner supply voltage Vtsr decreases. Therefore, as the duty ratio of the low state of the pulse signal output from the RS_CONT terminal becomes larger, the absolute value of the toner supply voltage Vtsr becomes larger, as illustrated in FIG. 3D. For example, the value of the toner supply voltage Vtsr is −400 V.

Each voltage value of the voltage output by each circuit is controlled to a target value by the CPU 181. Here, each voltage value of the voltage actually generated may deviate from the target value due to individual differences of components, particularly resistors, included in each circuit. For example, in the case of the charging circuit 132*b*, variation in values of the resistor R13 and the resistor R14 may cause deviation of the charging voltage Vpri from the target value. Therefore, inspection of output voltage is performed at the shipping of the power supply substrate 107 or the image forming apparatus 101, and control information (correction information) is obtained for setting each voltage value of the voltage to the target value. The nonvolatile memory 171 stores control information (correction information) for setting each voltage value of the voltage to the target value. For example, the control information indicates a correction value of the target value. The CPU 181 controls each of the circuits 132*b* to 135*b* based on a corrected target value that is a target value corrected by the correction value. The correction value is set such that output of each circuit matches to the target value by the CPU 181 controlling each of the circuits 132*b* to 135*b* with the corrected target value.

As has been described above, the nonvolatile memory 171 is provided on the power supply substrate 107. Here, although a method that stores the control information in the CPU 181 is conceivable, the CPU 181 and high-voltage circuits such as the charging circuit 132*b* are often provided on separate substrates. In addition, when a component is needed to be replaced in the future, such electric components are replaced substrate by substrate basis. Therefore, if the control information is stored in the CPU 181, the CPU 181 may become difficult to execute controlling tailored to a new power supply substrate 107 in a case where the power supply substrate 107 is replaced to new one. In the present embodiment, therefore, a nonvolatile memory 171 is mounted on the power supply substrate 107 that is mounted with the charging circuit 132*b* or the like, and then the control information is stored in the nonvolatile memory 171.

The CPU 181 outputs a clock signal to the nonvolatile memory 171, in order to read the information stored in the nonvolatile memory 171. Therefore, a clock line (signal line) from the CPU 181 is connected to a ROM_CLK_R terminal of the nonvolatile memory 171. In addition, the ROM_DATA_C terminal of the CPU 181 and the ROM_DATA_R terminal of the nonvolatile memory 171 are connected by a data line (signal line). The data line is used for transmission and reception of data between the CPU 181 and the nonvolatile memory 171, for example.

In the present embodiment, the signal provided from the BLD_SW terminal, which is used for controlling the blade circuit 135*b*, is also used as a clock signal for the nonvolatile memory 171. Therefore, the BLD_SW terminal of the CPU 181 is connected to both the capacitor C50 of the blade circuit 135*b* and the nonvolatile memory 171, as illustrated in FIG. 2. Specifically, the signal line connected to the BLD_SW terminal of the CPU 181 is branched into two, one of which is connected to the capacitor C50 and the other is connected to the ROM_CLK_R terminal of the nonvolatile memory 171. This can omit one signal line between the control unit 108 and the power supply substrate 107.

As has been described above, in the present embodiment, a pulse signal is output from the BLD_SW terminal to short-circuit both terminals of the Zener diode ZD51, while the developing roller 133*a* is stopped, thereby the electric potential difference between the developing roller 133*a* and the developing blade 135*a* is reduced to approximately zero. At this time, a pulse signal is output from the BLD_SW terminal, and therefore the CPU 181 can communicate with the nonvolatile memory 171.

On the other hand, while the developing roller 133*a* is rotating, the control unit 108 fixes the output from the BLD_SW terminal at the high level or the low level to differentiate the blade voltage Vbld from the developing voltage Vdev by a Zener voltage ΔVz. At this time, no pulse signal is output from the BLD_SW terminal and therefore the CPU 181 cannot communicate with the nonvolatile memory 171.

FIG. 4 illustrates a relation between the rotation state of the developing roller 133*a* and the control state of the blade circuit 135*b*. In the present embodiment, the CPU 181 cannot communicate with the nonvolatile memory 171 while the developing roller 133*a* is rotating. However, the read timing of the control information stored in the nonvolatile memory 171 precedes the image forming operation, i.e., the read timing is while the rotation of the developing roller 133*a* is stopped. Therefore, the foregoing raises no problem when it is not necessary to access the nonvolatile memory 171 while the developing roller 133*a* is rotating.

As described above, by sharing the control signal for controlling the blade circuit 135*b* and the clock signal to the nonvolatile memory 171, the signal lines connected to the control unit 108 can be reduced by one.

Second Embodiment

Next, a second embodiment will be explained mainly on differences from the first embodiment. In the first embodiment, the transistor Tr51 is turned to be in an OFF state by outputting, from the BLD_SW terminal, a signal fixed at a high level or a low level, i.e., a signal having a zero frequency, while the developing roller 133*a* is rotated. However, the transistor Tr51 is turned to be in an OFF state when the frequency of the pulse signal output from the BLD_SW terminal is lower than or equal to a first threshold value, depending on the values of the resistors, capacitors, or the like, of each circuit in the configuration illustrated in FIG. 2. In such a case, a clock signal is provided from the BLD_SW terminal to the nonvolatile memory 171 regardless of the rotation state of the developing roller 133*a*, and thus the control unit 108 can access the nonvolatile memory 171 regardless of the rotation state of the developing roller 133*a*.

In the aforementioned case, the frequency of the pulse signal output from the BLD_SW terminal may be set higher than a second threshold value in order to turn the transistor Tr51 to be in an ON state. Although the second threshold value can be the same as the first threshold value, the second threshold value may be set larger than the first threshold value in order to stably keep the transistor Tr51 in an ON state. For example, the first threshold value is 15 kHz, and the second threshold value is 30 kHz. FIG. 5 illustrates a relation between the rotation state of the developing roller 133*a* and the control state of the blade circuit 135*b* in the present embodiment.

As has been described above, the present embodiment allows for accessing the nonvolatile memory 171 during image formation, while sharing the control signal for controlling the blade circuit 135*b* and the clock signal to the nonvolatile memory 171.

<Additional Notes>

Although embodiments have been described using an image forming apparatus as an example of an apparatus including a voltage generating apparatus, the present invention is applicable to any apparatus that includes a voltage generating apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-097423, filed Jun. 16, 2022, which is hereby incorporated by reference herein in its entirety.

What is claimed is:

1. An image forming apparatus comprising:

a first circuit configured to output a first voltage;

an image forming unit configured to form an image on a printing material using the first voltage;

a controller configured to control a value of the first voltage output by the first circuit according to a control signal; and a storage unit configured to store control information of the first circuit, wherein the control signal is a pulse signal, wherein the controller controls, by controlling the frequency of the control signal, whether to set the value of the first voltage output by the first circuit to a first value or to a second value that is different from the first value, and wherein the controller uses the control signal for communication with the storage unit.

2. The image forming apparatus according to claim 1, wherein the image forming unit includes a photoconductor, and a developing roller configured to develop, with toner, an electrostatic latent image formed on the photoconductor, and the controller sets the value of the first voltage output by the first circuit to the first value while the developing roller is being rotated, and sets the value of the first voltage generated by the first circuit to the second value while the developing roller is not being rotated.

3. The image forming apparatus according to claim 2, further comprising a second circuit configured to output a second voltage having the second value, wherein the second voltage is applied to the first circuit.

4. The image forming apparatus according to claim 3, wherein the second voltage is applied to the developing roller, and the first voltage is applied to a developing blade that regulates thickness of the toner at the developing roller.

5. The image forming apparatus according to claim 1, wherein the first circuit is a developing blade circuit.

* * * * *